Aug. 8, 1939.                B. DARROW                2,168,514
                             SAFETY TUBE
                      Filed Sept. 23, 1938         2 Sheets-Sheet 1
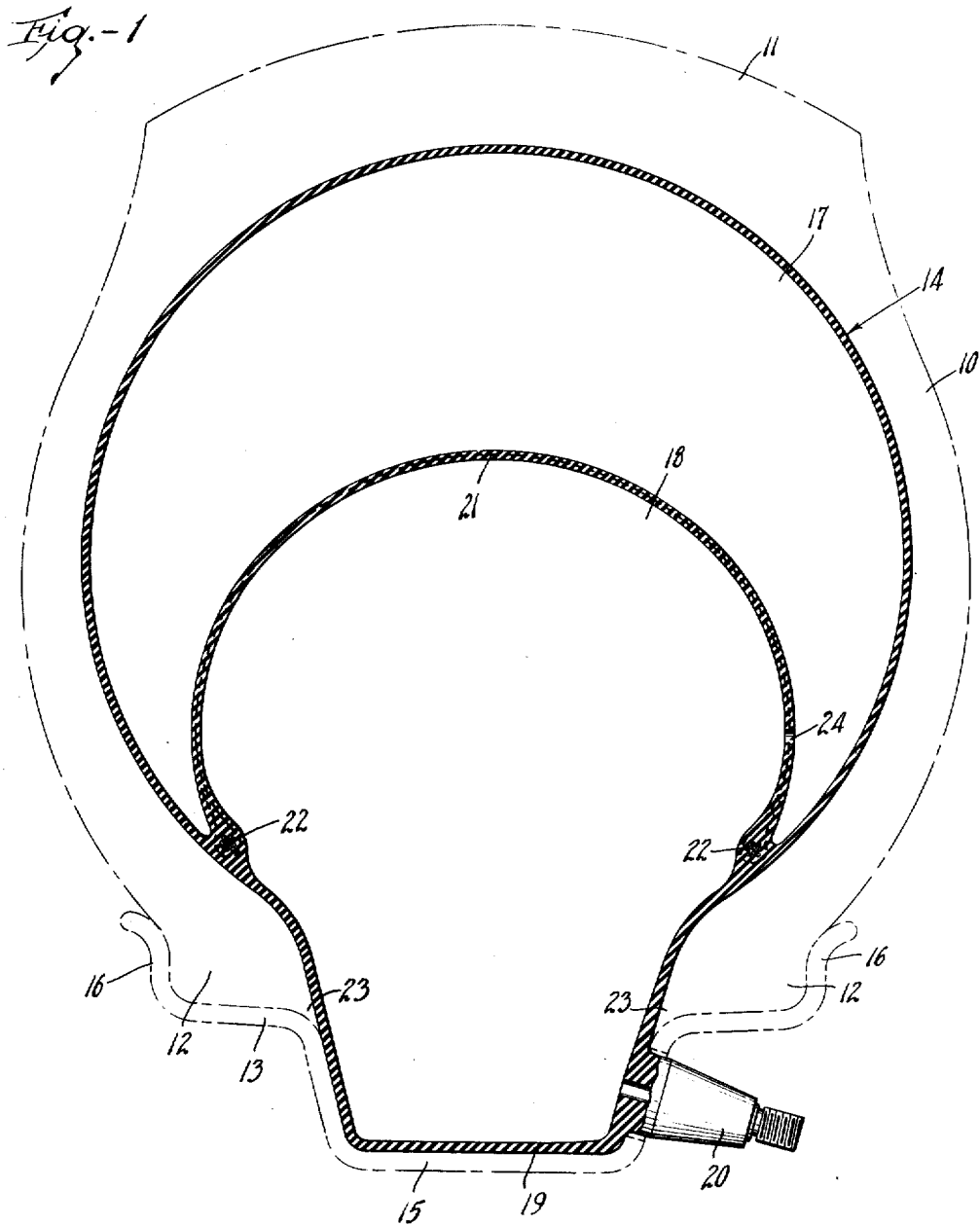
INVENTOR
BURGESS DARROW
BY
ATTORNEYS

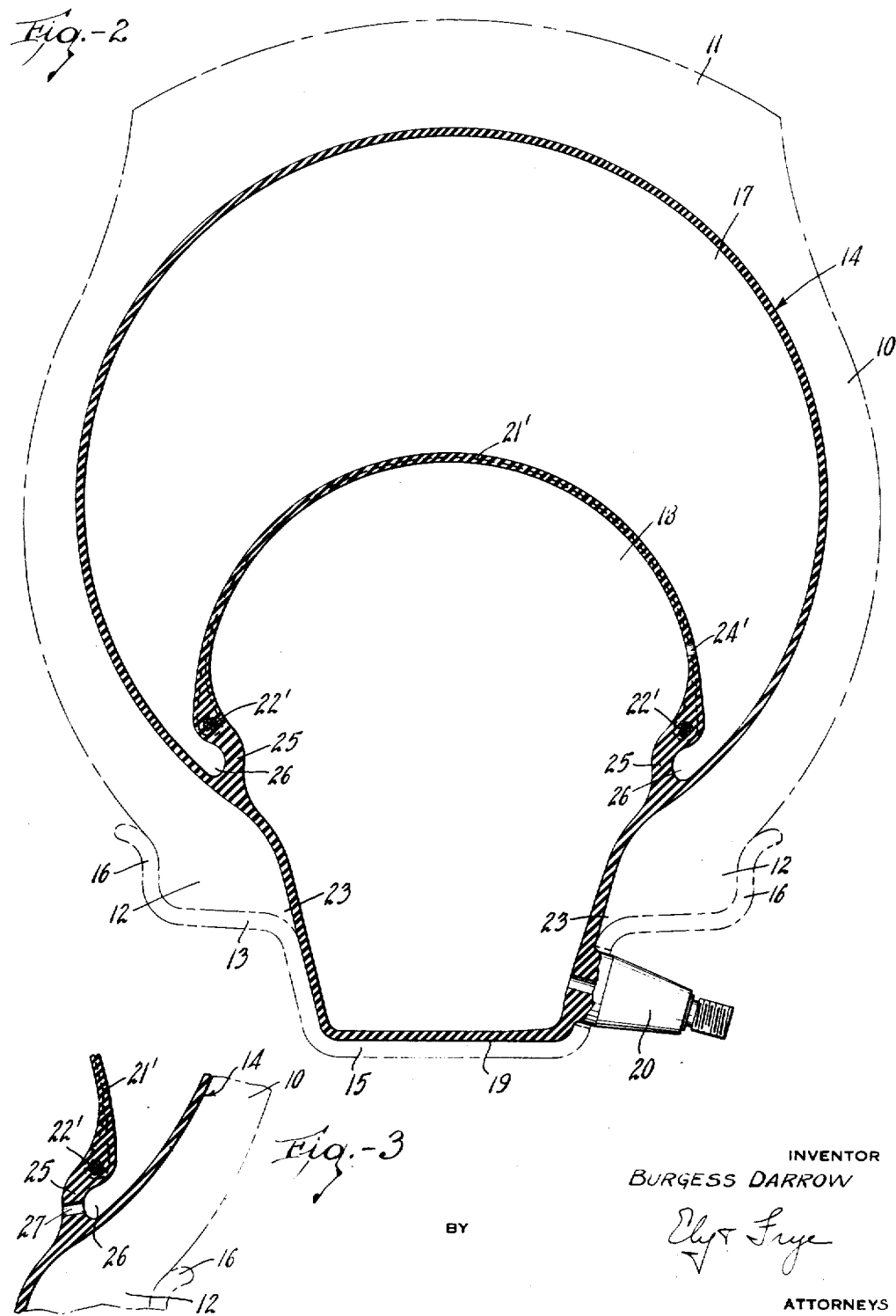

Patented Aug. 8, 1939

2,168,514

UNITED STATES PATENT OFFICE 2,168,514

SAFETY TUBE

Burgess Darrow, Akron, Ohio

Application September 23, 1938, Serial No. 231,375

6 Claims. (Cl. 152—342)

This invention relates to improvements in safety tubes and more particularly to safety tubes of the type having a plurality (usually two) of air or other gas receiving compartments which sustain a tire casing on a vehicle.

This type of tube has one or more small openings communicating between the compartments and in some constructions these openings are substantially unrestricted at all times so as to permit free passage of gas between the compartments. With an unrestricted opening between the compartments, in the event of a blowout in the wall of one compartment, the gas will slowly pass from the other compartment until the latter eventually becomes flat, but the vehicle can usually be brought safely to a stop before all the gas passes out of the tube.

In other constructions a valve is placed in the opening between the compartments which permits free passage of gas through the opening during normal inflation and deflation of the tube, but which, in the event of a blowout in the wall of one compartment, seals the gas in the other compartment whereby to permit continued running of the vehicle to a service station or garage for repairs.

My invention is adapted for use with either of the constructions referred to and consists primarily of the provision of restraining elements for the fabric in the inner of the two tubes which are used to form the gas receiving compartments, and the location of such restraining elements at points remote from the vehicle rim and from the toes of the tire beads.

I have discovered in the use of safety tubes, for example, of the type shown and described in United States Lee Patent No. 2,090,210, where fabric is used in the construction of the inner of the two tubes, that this fabric does not retain in use, the position that it occupied originally. In other words, when the ends of this fabric are secured in the base of the tube by vulcanization only, the rubber base stretches and the fabric ends creep outwardly during use, oftentimes bringing the fabric end, on one side or the other, in close proximity to the toe of the tire bead which sets up an abrasive action between the tube and the toes of the tire beads adjacent thereto sufficient eventually to cause an early failure of the tube at this point. Accordingly, it is an object of this invention to provide means to prevent creeping of this fabric while the tube is in use, and to keep the fabric ends remote from the toe of the tire beads, and consequently to increase the life of the tube.

It has been proposed to construct the inner of the two tubes with fabric extending completely around the tube in an attempt to curtail creeping of the fabric and avoid fabric ends entirely, but experience has shown that when such tube is used it does not at first conform to all corners of the chamber formed by the tire and rim, and when after being in use awhile it does conform, there has been a shift of material in the inner tube which causes thinning out of the tube, for example, where the wall of the outer tube joins the inside tube, which also results in an early failure of the tube at this point.

To overcome the disadvantages of this all-fabric type and other prior constructions, it is a further object of my invention to provide the inner of the two tubes with fabric around the outer portion thereof so as to retain all the advantages of the use of fabric, and to provide beads, preferably of the inextensible type, to which this fabric may be anchored to prevent creeping. These tube beads, remote from the toes of the tire beads and from all corners of the chamber formed by the tire and rim are to be located at points outwardly of the toes of the tire beads and outwardly of the flanges of the rim with which the structure is used, and they may be either of a floating or a non-floating type.

I am aware of a disclosure of the use of beads in a safety tube in Canadian Patent No. 359,817, granted August 11, 1936, but such beads are confined to the base of the tube, and they seat on the rim, well within the outer periphery of the rim flanges and adjacent the toes of the tire beads. No really useful result can be obtained by utilizing beads in the location shown in said patent for universal use on all types of rims because such beads are substantially in the same plane as the beads of a tire with which the tube is used, making a bulky and unwieldy construction at the base of the unit, and one entirely impractical on a drop center rim.

As a result of my experiences with safety tubes I have discovered that the use of inextensible beads for the inner chamber has many advantages over a construction which omits such beads, and I have the following observations to make. The ideal construction consists of a rubber base which can readily conform to the contour of any rim with which the tube is used whether it be a flat-base, a drop-center or semidrop-center rim. The rubber in the base should extend well above the toes of the tire beads so as to avoid the use of fabric in the area adjacent the toes of the tire beads. The inner of the two chambers or tubes should have its outer wall formed of fabric anchored at its ends to inextensible beads located outwardly of the toes of the tire beads in lateral directions so as to insure ample volume in the inner chamber, and outwardly of the toes of the tire beads in a radial direction so as to eliminate fabric adjacent the tire bead toes. The tube beads should preferably be located outwardly of the rim flanges in a radial direction in order to insure free passage of the beads over the rim flanges during mounting and dismounting of the tube, to insure that the ends of the fabric are located a sufficient distance from the tire bead toes, and to economize in the use of fabric.

In using beads as aforesaid it has been found that when mounting the tube the latter tends to center itself properly on the rim so that a truer mounting can be quickly obtained. During normal operation of the tube on a moving vehicle with both chambers inflated, the beads tend to overcome the centrifugal force which urges the inner tube towards the outer tube. When a blowout occurs in the outer chamber, the beads positively prevent the inner chamber from moving outwardly, holding such chamber in its normal position. Also, during inflation of the tube the inner chamber can be rapidly inflated without damaging or misplacing it.

Other objects and advantages of the invention will become apparent from the following description taken in conjunction with the accompanying drawings.

In the drawings:

Fig. 1 is a section through a safety tube embodying my invention, with a tire casing and rim shown in broken lines, Fig. 2 is a similar view showing a modified form of the invention, and Fig. 3 is a fragmentary section showing an alternative location for the opening between the tube compartments.

Referring to the drawings the numeral 10 indicates a conventional tire casing having a tread portion 11 and inextensible bead portions 12. This casing is adapted to be sustained in use on a rim 13, shown in this instance to be of the drop center type, by means of an inner tube indicated as a whole by numeral 14. Rim 13 is provided with the customary well 15 and flanges 16.

Tube 14 comprises two chambers or compartments 17 and 18, termed respectively the outer and inner compartments, which extend circumferentially of the tube. The compartments 17 and 18 may also be termed outer and inner tubes. The base 19 of tube 14 is formed of rubber and has the conventional inflating and deflating valve 20 secured thereto and extending through rim 13. The outer wall of compartment 17 is also formed of rubber and joins with the base 19 to form an integral construction.

The inner wall of compartment 17, which also is the outer wall of compartment 18, is formed of one or more plies 21 of rubberized fabric, either cord or square woven, and where more than one ply of fabric is used, I prefer that the plies be arranged with the cords on a bias in opposite directions in the respective plies. This bias arrangement is well known in the tire building art and it is not believed to be necessary to illustrate same herein.

Referring particularly to Fig. 1 it will be observed that the ends of the fabric 21 are anchored to inextensible wire beads 22 which are embedded in rubber which is vulcanized in the usual manner to the outer wall of compartment 17 at points well above the toes 23 of the tire beads 12. Thus, two compartments or tubes are formed having the common base 19, with one or more openings 24 through the fabric wall 21 permitting passage of air between the tubes. The outer tube being formed of rubber is free to expand into contact with the tire casing, while the inner tube is restrained substantially to the position illustrated.

It will be noted that the fabric 21 terminates well above the toes of the tire beads so that no fabric endings are permitted at or near the toes of the tire beads. The beads 22 are located outwardly of the tire bead toes in lateral directions as well as in a radial direction, and they are also located radially outwardly of the rim flanges 16.

My safety tube may be constructed by any suitable method, such, for example, as that described in Lee Patent No. 2,090,210. While I have illustrated a construction having a substantially unrestricted opening 24 between the compartments, it will be obvious that the features of the invention may be readily used with the type of tube having a valve in such opening.

In mounting my safety tube it will be found that the provision of beads as shown permits the tube to more properly center itself. During inflation it will be found that the inner chamber can be inflated rapidly without damaging or misplacing it, and it will assume substantially the position shown in the drawings. In use on a vehicle in motion the beads restrain the fabric 21 and tend to overcome centrifugal force which urges the wall of the inner chamber toward the wall of the outer. Lastly, when a blowout occurs in the outer chamber, the beads hold the inner chamber in its normal position and prevent such chamber from moving outwardly.

A modified form of the invention is shown in Fig. 2, wherein the beads 22', which anchor the ends of the fabric 21' in the same manner as in the Fig. 1 construction, are permitted a limited amount of movement or flotation. In Fig. 1, beads 22 are connected directly to the rubber of the outer chamber, but beads 22' are connected to the rubber wall by means of rubber strips or inserts 25 which are vulcanized to the beads and rubber wall respectively. The strips 25 preferably are vulcanized so as to form fillets 26 which tend to keep the strips 25 as far away as practical from the adjacent rubber wall. This floating bead structure provides all the features and advantages of the construction in Fig. 1, and in addition eliminates all tension at the joints between the two tubes.

In Fig. 2, the opening 24' between the two compartments is shown in the fabric wall 21', but in lieu thereof an opening 27 may be formed in one of the rubber strips 25, as shown in Fig. 3.

I have repeatedly referred to the fabric of which the outer portion of the inside tube is constructed because cotton cord fabric is most commonly used, but my use of restraining elements would apply equally to any material substituted for the ordinary cotton cord fabric.

While I have illustrated and described the preferred forms of my invention, it will be understood that the invention is not so limited, and that various modifications may be made within the spirit of the invention and within the scope of the subjoined claims.

What is claimed is:

1. In a unit comprising a tire casing having beads therein, a tube within said casing, and a flanged rim receiving said casing and tube, said tube being formed with inner and outer circumferential compartments, the outer wall of said inner compartment comprising rubberized restraining elements, and inextensible beads in said outer wall to which the extremities of said restraining elements are secured, said last named beads being located outwardly of the toes of the tire casing beads and outwardly of the rim flanges.

2. In a unit comprising a tire casing having beads therein, a tube within said casing, and a flanged rim receiving said casing and tube, said tube being formed with inner and outer circumferential compartments, the outer wall of said inner compartment comprising rubberized restraining elements, and inextensible beads in said outer wall to which the extremities of said restraining elements are secured, said last named beads being located outwardly in lateral directions and outwardly in a radial direction of the toes of the tire casing beads, and outwardly radially of the rim flanges.

3. A tube of the character described comprising inner and outer circumferential compartments, the outer wall of said inner compartment comprising rubberized restraining elements, and inextensible beads in said wall to which the extremities of said restraining elements are secured, said beads being spaced from the outer wall of said outer compartment to allow limited flotation of said beads.

4. A tube of the character described comprising inner and outer circumferential compartments, the outer wall of said inner compartment comprising rubberized restraining elements, inextensible beads in said wall to which the extremities of said restraining elements are secured, and rubber strips connecting said beads to the outer wall of said outer compartment.

5. A tube of the character described comprising inner and outer circumferential compartments, the outer wall of said inner compartment comprising rubberized restraining elements, and inextensible beads in said wall to which the extremities of said restraining elements are secured, said beads being spaced from the ends of said wall to allow limited flotation of said beads.

6. A tube of the character described comprising inner and outer circumferential compartments, the outer wall of said inner compartment comprising rubberized restraining elements, and extensible, floating beads in said wall to which the extremities of said restraining elements are secured.

BURGESS DARROW.

---

CERTIFICATE OF CORRECTION.

Patent No. 2,168,514.            August 8, 1939.

BURGESS DARROW.

It is hereby certified that error appears in the printed specification of the above numbered patent requiring correction as follows: Page 3, second column, line 23-24, claim 6, for the word "extensible" read inextensible; and that the said Letters Patent should be read with this correction therein, that the same may conform to the record of the case in the Patent Office.

Signed and sealed this 14th day of November, A. D. 1939.

(Seal)                           Henry Van Arsdale,
                                  Acting Commissioner of Patents.

tube being formed with inner and outer circumferential compartments, the outer wall of said inner compartment comprising rubberized restraining elements, and inextensible beads in said outer wall to which the extremities of said restraining elements are secured, said last named beads being located outwardly of the toes of the tire casing beads and outwardly of the rim flanges.

2. In a unit comprising a tire casing having beads therein, a tube within said casing, and a flanged rim receiving said casing and tube, said tube being formed with inner and outer circumferential compartments, the outer wall of said inner compartment comprising rubberized restraining elements, and inextensible beads in said outer wall to which the extremities of said restraining elements are secured, said last named beads being located outwardly in lateral directions and outwardly in a radial direction of the toes of the tire casing beads, and outwardly radially of the rim flanges.

3. A tube of the character described comprising inner and outer circumferential compartments, the outer wall of said inner compartment comprising rubberized restraining elements, and inextensible beads in said wall to which the extremities of said restraining elements are secured, said beads being spaced from the outer wall of said outer compartment to allow limited flotation of said beads.

4. A tube of the character described comprising inner and outer circumferential compartments, the outer wall of said inner compartment comprising rubberized restraining elements, inextensible beads in said wall to which the extremities of said restraining elements are secured, and rubber strips connecting said beads to the outer wall of said outer compartment.

5. A tube of the character described comprising inner and outer circumferential compartments, the outer wall of said inner compartment comprising rubberized restraining elements, and inextensible beads in said wall to which the extremities of said restraining elements are secured, said beads being spaced from the ends of said wall to allow limited flotation of said beads.

6. A tube of the character described comprising inner and outer circumferential compartments, the outer wall of said inner compartment comprising rubberized restraining elements, and extensible, floating beads in said wall to which the extremities of said restraining elements are secured.

BURGESS DARROW.

---

CERTIFICATE OF CORRECTION.

Patent No. 2,168,514.                      August 8, 1939.

BURGESS DARROW.

It is hereby certified that error appears in the printed specification of the above numbered patent requiring correction as follows: Page 3, second column, line 23-24, claim 6, for the word "extensible" read inextensible; and that the said Letters Patent should be read with this correction therein, that the same may conform to the record of the case in the Patent Office.

Signed and sealed this 14th day of November, A. D. 1939.

(Seal)                                            Henry Van Arsdale,
                                                         Acting Commissioner of Patents.